United States Patent Office 3,040,035
Patented June 19, 1962

3,040,035
17α - ACYLOXY - 6α - METHYL - 16 - METHYLENE-PREGN-4-ENE-3,20-DIONES AND PROCESS AND INTERMEDIATES FOR THE PREPARATION THEREOF
Vladimir Petrow, London, and George Oliver Weston, Huddersfield, England, assignors to The British Drug Houses Limited, London, England
No Drawing. Filed June 28, 1961, Ser. No. 120,148
Claims priority, application Great Britain June 28, 1960
14 Claims. (Cl. 260—239.55)

This invention is for improvements in or relating to organic compounds and has particular reference to steroidal unsaturated acyloxy diones having the general Formula I below and a method for their preparation.

It is an object of the present invention to provide a new and improved route to unsaturated acyloxy diones having the general Formula I below which compounds are of value on account of their biological properties and in particular on account of their progestational properties as revealed in our co-pending patent application No. 829,234.

According to the present invention there is provided a new and improved process for the preparation of 17α-acyloxy - 6α - methyl - 16 - methylenepregn - 4 - ene - 3, 20-diones having the general formula

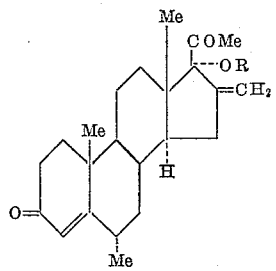

(where R is an acyl group containing up to 10 carbon atoms) which process comprises oxidising with an organic peracid 3β-hydroxy- or a 3β-acyloxy-16α,17α-epoxy-16β-methylpregn-5-en-20-one having the general formula

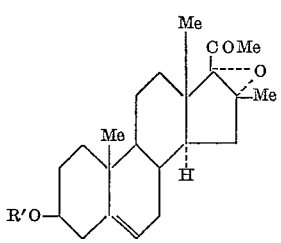

(where R' is a hydrogen or an acyl group containing up to 10 carbon atoms) to the corresponding 5α,6α,16α,17α-bis-epoxide having the general formula

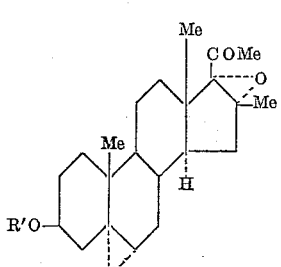

(where R' is hydrogen or an acyl group containing up to 10 carbon atoms), reducing the 20-keto group to a 20-hydroxyl group, treating the resulting dihydroxy compound or diacyloxy compound having the general formula

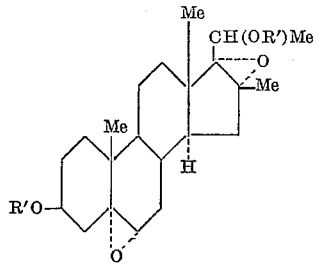

(where R' has the same meaning as above) with methyl magnesium halide to give 16α,17α-epoxy-6β,16β-dimethyl-pregnane-3β,5α,20-triol having the formula

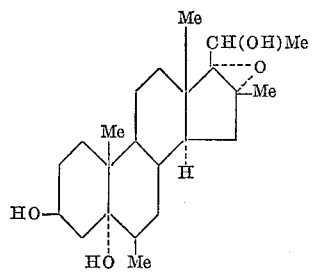

oxidising the dimethyl triol epoxide to 16α,17α-epoxy-5α-hydroxy-6β,16β-dimethylpregnane-3,20-dione having the formula

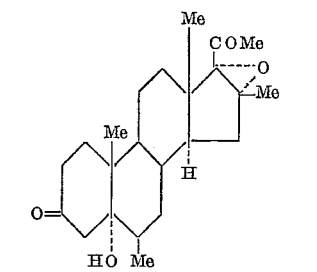

dehydrating the hydroxydione and isomerising the 6β-methyl to a 6α-methyl group to give 16α,17α-epoxy-6α,16β-dimethylpregn-4-ene-3,20-dione having the formula

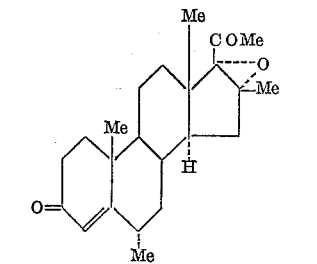

treating the dimethyl epoxide with a lower carboxylic acid anhydride containing up to 20 carbon atoms in the presence of an acidic catalyst to give a 3,17α-diacyloxy-6-methyl-16-methylene-3,5-diene having the formula

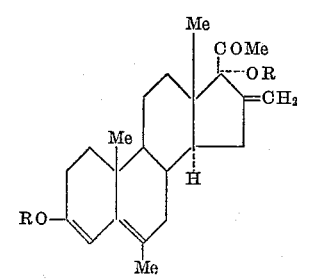

(where R is an acyl group containing up to 10 carbon atoms) and selectively hydrolysing the acyloxy group at position 3.

The invention also provides the following new compounds:

3β - acetoxy - 5α,6α,16α,17α - bis - epoxy - 16β - methyl-pregnan-20-one

5α,6α,16α,17α - bis - epoxy - 3β - hydroxy - 16β - methyl-pregnan-20-one

5α,6α,16α,17α - bis - epoxy - 16β - methyl - pregnane - 3β,20β-diol

3β,20β - diacetoxy - 5α,6α,16α,17α - bis - epoxy - 16β-methyl-pregnane

16α,17α-epoxy-6β,16β-dimethyl-pregnane-3β,5α,20β-triol

16α,17α-epoxy-6β,16β-dimethyl-pregnan-5α-ol-3,20-dione 3,17α - diacetoxy - 6 - methyl - 16 - methylenepregna-3,5-dien-20-one which compounds are of value on account of their biological properties or as intermediates for the preparation of compounds having valuable biological properties.

The starting material used in this invention is 3β-hydroxy- or a 3β-acyloxy-16α,17α-epoxy-16-methylpregn-5-en-20-one (wherein the acyl group contains up to 10 carbon atoms). 3β-acetoxy-16,17α-epoxy-16-methyl-pregn-5-en-20-one by methods of prior art see for example J.C.S., 1960, page 2385, Kirk, Petrow, Stansfield and Williamson may be prepared.

The bis-epoxide (III) is prepared by oxidation of the starting material (II) conveniently with perbenzoic or monoperphthalic acid, in an anhydrous solvent such as chloroform or dichloromethane or in a mixture of solvents such as chloroform/ether at temperatures between 0° C. and 50° C. but preferably at room temperature.

Reduction of the 20-ketone group of the bis-epoxide (III) is readily effected by the action of sodium borohydride in an alkaline alcoholic solvent, and is most conveniently carried out at an elevated temperature up to the boiling point of the solvent since the bis-epoxide (III) is only sparingly soluble in alcoholic solvents. A 3-acyloxy-compound (III; R'=acyl) is hydrolysed during the reaction, when the major product is the 3β,20β-diol-bis-epoxide (IV; R'=H; 20β), with a small proportion of the 3β,20α-diol (IV; R'=H; 20α). The compounds herein described are derived from the 3β,20β-diol, but it will be apparent to those skilled in the art that the process of this invention may also be carried out on the 3β,20α-diol or on a mixture of the 3β,20β and 3β,20α-diols since on oxidation to the 3,20-diketone (VI) both compounds yield the same product. The 3β,20-diol is preferably acylated to give the diacyl derivative.

The 6β-methyl-3β,5α-20-triol (V) is obtained by the action of a methyl magnesium halide such as methyl magnesium iodide on the bis-epoxide diol (IV; R'=H) or preferably on its diacyl ester (IV; R'=Acyl) in an organic solvent such as diethyl ether, tetrahydrofuran or benzene. Under the experimental conditions employed the 5α,6α-epoxy group only is attacked which reaction represents a surprising feature of the present invention. The product is the 6β-methyl-16α,17α-epoxy triol (V) which may be oxidised to the 3,20-diketone (VI) by, for example, chromic acid or the complex of chromium trioxide and pyridine or by other methods which will be apparent to those skilled in the art. On treatment with a catalytic quantity of hydroxide ions in alcoholic solution the 5α-hydroxyl group is smoothly eliminated and the 6β-methyl group isomerised to the stable equatorial 6α-position yielding the 6α-methyl-4-ene-3,20-dione (VII) described in co-pending application No. 829,234.

In application No. 829,234 was described inter alia a process for conversion of the 16α,17α-epoxide (VII) to the required 17α-acyloxy-16-methylene compounds (I) by treatment of the epoxide (VII) with a hydrogen halide followed by Raney nickel and if desired conversion of the resulting 17α-hydroxy-16-methylene compound (I; R=H) into the 17α-acyl derivative. We have now discovered that this process converting compound VII to compound VIII may be improved. We have found that on treatment with an acidic catalyst such as toluene-p-sulphonic acid using an acyl anhydride as solvent the 16α,17α-epoxy-16β-methyl group undergoes rearrangement and acylation to yield the 17α-acyloxy-16-methylene compound (VIII; R=acyl) in one simple operation. This reaction proceeds at normal temperatures, but may with advantage be carried out at temperatures of up to 100° C. at which temperatures the steroid starting material is more readily soluble in the acyl anhydride. A further advantage in using elevated temperatures is that the reaction proceeds more rapidly.

The diacylate (VIII; R=acyl) may be obtained in a pure form by crystallisation from suitable non-acidic solvents, but it may be more advantageous to subject the crude material to mild hydrolysis as described in application No. 829,234 and then to purify the valuable steroid product (I).

Following is a description by way of example of a method of carrying the invention into effect.

EXAMPLE

*3β-Acetoxy-5α,6α,16α,17α-Bis-Epoxy-16β-Methyl-Pregnan-20-One (III; R'=Ac)*

3β - acetoxy - 16,17α-epoxy-16β-methylpregn-5-en-20-one (10 g.) dissolved in chloroform (100 ml.) was treated at 22° C. with a 1.2 normal ethereal solution of monoperphthalic acid (100 ml.) whereupon the temperature of the mixture rose rapidly to 32° C. After standing for 2½ hours at 20° C. the solution was washed with sodium bicarbonate solution, dried over sodium sulphate and evaporated. The residue was crystallised from methanol to give 3β-acetoxy-5α,6α,16α,17α-bis-epoxy-16β-methyl-(5α)-pregnan-20-one, needles, M.P. 188 to 189° C., $[\alpha]_D^{28}$—26.5° (c., 0.95 in chloroform).

*5α,6α,16α,17α-Bis-Epoxy-3β-Hydroxy-16β-Methyl-Pregnan-20-One (III; R'=H)*

16α,17α - epoxy - 3β-hydroxy-16β-methylpregn-5-en-20-one was reacted with monoperphthalic acid as above and the product crystallised from methanol to give 5α,6α,16α,17α - bis - epoxy-3β-hydroxy-16β-methyl-pregnan-20-one, flakes, M.P. 226° to 227° C., $[\alpha]_D^{28}$—28.5° (c., 0.9 in chloroform).

*5α,6α,16α,17α-Bis-Epoxy-16β-Methyl-Pregnane-3β-20β-Diol (IV; R=H)*

5α,6α,16α,17α - bis - epoxy - 3β - hydroxy - 16β-methyl-pregnan-20-one (5.6 g.) dissolved in boiling methanol (200 ml.) was treated with a solution of potassium hydroxide (5 g.) in water (10 ml.) followed by solid sodium borohydride (1.0 g.). The solution was boiled for 15 minutes then cooled and the crystalline precipitate collected and washed with methanol. The material so obtained was pure 5α,6α,16α,17α-bis-epoxy-16β-methyl-pregnane-3β,20β-diol, M.P. 255 to 256° C., $[\alpha]_D^{28}$—61.5° (c. 0.9 in chloroform).

This compound was also obtained by reduction of 3β-acetoxy - 5α,6α,16α,17α - bis - epoxy-16β-methyl-pregnan-20-one since the 3β-acetoxy group is hydrolysed under the conditions of the reduction.

*3β,20β-Diacetoxy-5α,6α,16α17α-Bis-Epoxy-16β-Methyl-Pregnane (IV; R'=Ac)*

5α,6α,16α,17α - bis - epoxy - 16β - methyl - pregnane-3β,20β-diol (5 g.) was dissolved in a mixture of pyridine (15 ml.) and acetic anhydride (10 ml.) and maintained at a temperature of 100° C. for 1 hour. The solution was diluted with water and the precipitated solid crystallised from aqueous methanol to give 3β,20β-diacetoxy-5α,6α,16α,17α-bis-epoxy-16β-methyl-pregnane, flakes, M.P. 190 to 192° C., $[\alpha]_D^{28}$—43° (c., 0.9 in chloroform).

16α,17α-Epoxy-6β,16β-Dimethyl-Pregnane-3β,5α,20β-Triol (V)

3β,20β - diacetoxy-5α,6α,16α,17α - bis - epoxy - 16β-methylpregnane (5 g.) was suspended in dry diethyl ether (250 ml.) and added to a refluxing solution of methyl magnesium iodide prepared from magnesium (5 g.) and methyl iodide (12.5 ml.) in dry ether (125 ml.). The mixture was stirred at reflux temperature for four hours, then cooled in ice, decomposed with ammonium chloride solution, washed with water, dried over sodium sulphate and evaporated. The residue was crystallised first from ethyl acetate and then from aqueous methanol to give 16α,17α - epoxy - 6β,16β - dimethylpregnane-3β,5α,20β-triol, needles, M.P. 185 to 188° C., $[\alpha]_D^{28}$—15.7° (c., 0.9 in chloroform).

16α,17α-Epoxy - 6β,16β - Dimethyl-Pregnan - 5α-Ol-3,20-Dione (VI)

16α,17α - epoxy - 6β,16β - dimethyl - pregnane-3β,5α,20β-triol (.75 g.) was dissolved in acetone (50 ml.) and was treated at room temperature with a solution of chromic acid prepared by dissolving chromic oxide (26.72 g.) in concentrated sulphuric acid (23 ml.) and diluting with water to 100 ml. After the addition of 1.0 ml. of this reagent the acetone solution retained an orange colour. The solution was then poured into a large volume of water and the precipitated crystalline solid recrystallised from dichloromethane and methanol to give 16α,17α - epoxy - 6β, 16β-dimethyl-pregnan-5α-ol-3,20-dione, flakes M.P. 242 to 244° C., $[\alpha]_D^{24}$+42.2° (c., 0.85 in chloroform).

16α,17α - Epoxy-6α,16β - Dimethylpregn - 4 - Ene-3,20-Dione (VII)

16α,17α - epoxy - 6β,16β - dimethyl-pregnan-5α-ol-3,20-dione (0.5 g.) dissolved in methanol (25 ml.) was treated with 1 ml. of a 10% solution of sodium hydroxide in water and was boiled for 30 minutes. On dilution and cooling 16α,17α - epoxy - 6α,16β - dimethylpregn-4-ene-3,20-dione was obtained, identical with a sample prepared by the method described in co-pending application No. 829,234.

3,17α - Diacetoxy - 6 - Methyl-16-Methylenepregna-3,5-Dien-20-One (VIII; R=Ac)

(a) 16α,17α - epoxy-6α,16β - dimethylpregn-4-ene-3,20-dione (1 g.) was stirred with acetic anhydride (5 ml.) and toluene-p-sulphonic acid (0.1 g.) for 4 hours at 20° C. The solution was poured into a large volume of water and stirred to decompose the acetic anhydride. The precipitated solid was collected and crystallised from aqueous methanol containing a trace of pyridine to yield 3,17α - diacetoxy - 6 - Methyl - 16 - methylenepregna-3,5-dien-20-one as flakes M.P. 148 to 149° C., $[\alpha]_D^{25}$—237.4 (c., 0.8 in chloroform)

$\lambda_{max.}^{EtOH}$ 244 mμ (ε 18,400)

(b) 16α,17α - epoxy - 6α,16β - dimethylpregn - 4 - ene-3,20-dione (1 g.) was dissolved in acetic anhydride (5 ml.) at a temperature of 100° C. Toluene-p-sulphonic acid (0.1 g.) was added and the solution was maintained at 100° C. for 10 minutes. Precipitation in water and crystallisation from aqueous methanol containing a trace of pyridine yielded 3,17α - diacetoxy-6-methyl-16-methylenepregna-3,5-dien-20-one identical with the material described above.

17α-Acetoxy-6α-Methyl-16-Methylenepregn-4-Ene-3,20-Dione (I; R=Ac)

3,17α - diacetoxy - 6 - methyl - 16 - methylenepregna-3,5-dien-20-one (1 g.) was dissolved in methanol (100 ml.) and treated with potassium hydroxide (0.9 g.) dissolved in water (4 ml.) and methanol (10 ml.) for 7 minutes at room temperature. Acetic acid (2 ml.) was added and the solution evaporated under reduced pressure to a small volume. Water was added and the precipitate collected and recrystallised from aqueous methanol to yield 17α - acetoxy - 6α - methyl - 16 - methylenepregn-4-ene-3,20-dione identical with a sample prepared as described in application No. 829,234.

We claim:
1. A process for the preparation of 17α-acyloxy-6α-methyl-16-methylenepregn-4-ene-3,20-diones having the general formula

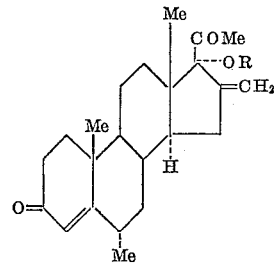

(I)

where R is an acyl group derived from a hydrocarbon carboxylic acid containing up to 10 carbon atoms, which process comprises oxidising with an organic peracid a steroid selected from the group consisting of 3β-hydroxy- and 3β-acyloxyl - 16α,17α-epoxy-16β-methylpregn-5-en-20-ones having the general formula

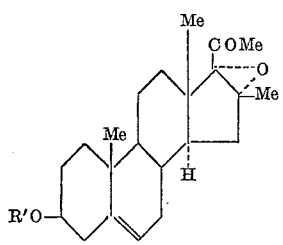

(II)

where R' is selected from the group consisting of hydrogen and acyl derived from a hydrocarbon carboxylic acid containing up to 10 carbon atoms, to the corresponding 5α,6α,16α,17α-bis-epoxide having the general formula

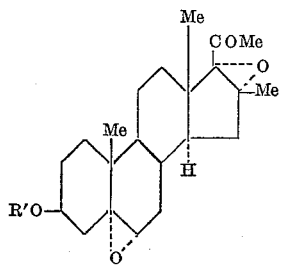

(III)

where R' is selected from the group consisting of hydrogen and acyl derived from a hydrocarbon carboxylic acid containing up to 10 carbon atoms, reducing the 20-keto group to a 20-hydroxyl group with a metal hydride, treating the resulting compound having the general formula

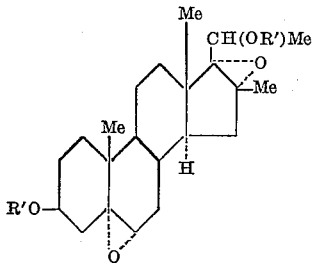

(IV)

where R' has the same meaning as above, with methyl magnesium halide to give 16α,17α-epoxy-6β,16β-dimethyl-pregnane-3β,5α,20-triol having the formula

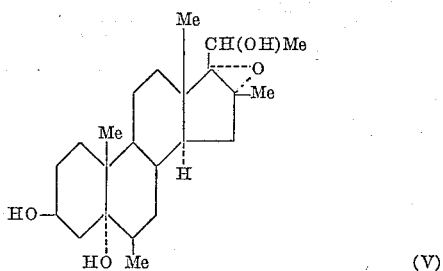

(V)

oxidising the dimethyl triol epoxide with a chromic oxidizing agent to 16α,17α-epoxy-5α-hydroxy-6β,16β-dimethyl-pregnane-3,20-dione having the formula

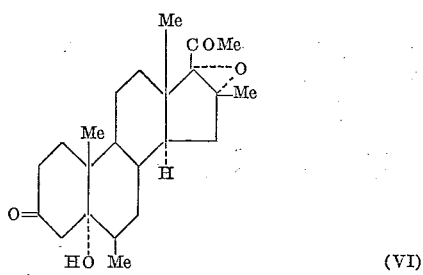

(VI)

dehydrating the hydroxydione and isomerising the 6β-methyl to a 6α-methyl group in an organic solvent with a catalytic quantity of an alkali to give 16α,17α-epoxy-6α,16β-dimethyl-pregn-4-ene-3, 20-dione having the formula

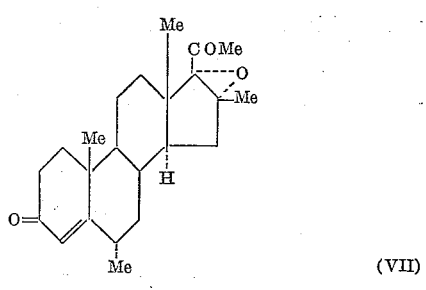

(VII)

treating the dimethyl epoxide with a lower hydrocarbon carboxylic acid anhydride providing a residue of a hydrocarbon carboxylic acid having up to 10 carbon atoms in the presence of an aromatic sulphonic acid catalyst to give a 3,17α-diacyloxy-6-methyl-16-methylene-3,5-diene having the formula

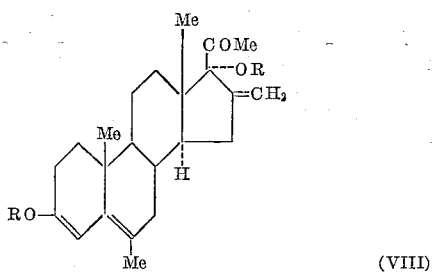

(VIII)

where R is an acyl group derived from a hydrocarbon carboxylic acid containing up to 10 carbon atoms, and selectively hydrolysing the acyloxy group at position 3.

2. A process as claimed in claim 1 wherein the organic per-acid is selected from the group consisting of perbenzoic and monoperphthalic acids employed in an anhydrous solvent.

3. A process as claimed in claim 1 wherein reduction of the 20-ketone group is effected by the action of sodium borohydride in an alkaline alcoholic solvent.

4. A process as claimed in claim 1 wherein the methyl magnesium halide is methyl magnesium iodide employed in an organic solvent selected from the group consisting of diethyl ether, tetrahydrofuran and benzene.

5. A process as claimed in claim 1 wherein the dimethyl triol epoxide is oxidised with chromic acid to form 16α,17α - epoxy - 5α - hydroxy-6β,16β-dimethyl-pregnane-3,20-dione.

6. A process as claimed in claim 1 wherein 16α,17α-epoxy-5α-hydroxy - 6β,16β - dimethylpregnane - 3,20-dione is dehydrated and isomerised with a catalytic quantity of hydroxide ions in alcoholic solution.

7. A process as claimed in claim 1 wherein 16α,17α-epoxy - 6α,16β - dimethylpregn-4-ene-3,20-dione is treated with toluene-p-sulphonic acid in the presence of an acyl anhydride as solvent to give the 3,17α-diacyloxy-6-methyl-16-methylene-3,5-dione.

8. 3β - acetoxy - 5α,6α,16α,17α-bis-epoxy-16β-methyl-pregnan-20-one.

9. 5α,6α,16α,17α - bis - epoxy - 3β - hydroxy - 16β-methylpregnan-20-one.

10. 5α,6α,16α,17α - bis - epoxy - 16β - methylpregnane-3β,20β-diol.

11. 3β,20β-diacetoxy - 5α,6α,16α,17α - bis - epoxy-16β-methyl-pregnane.

12. 16α,17α-epoxy-6β,16β-dimethyl-pregnane-3β,5α,20β-triol.

13. 16α,17α-epoxy-6β,16β-dimethyl-pregnan-5α-ol-3,20-dione.

14. 3,17α-diacetoxy - 6 - methyl - 16-methylenepregna-3,5-dien-20-one.

No reference cited.